RANGE EXTENSION EQUIPMENT IN STEP-BY-STEP TELEPHONE SYSTEMS

Filed Sept. 9, 1966

INVENTOR
C. W. ZEBE
BY [signature]
ATTORNEY

July 1, 1969 C. W. ZEBE 3,453,392

RANGE EXTENSION EQUIPMENT IN STEP-BY-STEP TELEPHONE SYSTEMS

Filed Sept. 9, 1966 Sheet 3 of 4

United States Patent Office 3,453,392

Patented July 1, 1969

3,453,392

RANGE EXTENSION EQUIPMENT IN STEP-BY-STEP TELEPHONE SYSTEMS

Charles W. Zebe, New Shrewsbury, N.J., assignor to Bell Telephone Laboratories, Incorporated, Murray Hill, N.J., a corporation of New York Filed Sept. 9, 1966, Ser. No. 578,349

Int. Cl. H04q 3/47

U.S. Cl. 179—16.5 9 Claims

ABSTRACT OF THE DISCLOSURE

A step-by-step telephone system is disclosed wherein flexibility in directory number assignment is maintained notwithstanding the necessity for providing range extension circuitry for "long lines." The physical locations of the long lines are segregated on a special long line connector, and translator facilities are provided for converting the unrestricted directory numbers of the long lines to equipment numbers corresponding to the physical locations of the long lines on the special connector.

This invention relates to telephone switching systems and, more particularly, to step-by-step telephone systems including range extender facilities for servicing lines which are at a greater than predetermined distance from the central office. Such lines, sometimes referred to as "long lines," exhibit a loop resistance between the substation and the office which is higher than a predetermined norm.

Range extension facilities are well known in the art and an improved circuit for use in No. 5 Crossbar offices is shown in an application of A. Feiner, A. Zarouni, and C. W. Zebe; Ser. No. 402,081 of Oct. 7, 1964, now Patent No. 3,339,027. A range extension system for use in conjunction with step-by-step offices is shown in my application, Ser. No. 438,318 of Mar. 9, 1965, now Patent No. 3,403,228.

While wholly operative and useful, these arrangements do not directly confront a problem in range extension facilities that is inherent in the nature of step-by-step telephone circuitry. This problem derives, in part, from the categorical association between the called directory number of a telephone line in the terminating mode of operation of the step-by-step system and the corresponding physical or equipment location of the terminals of that line. In short, if a called station number is 2983, the final two digits actually designate a fixed physical group of terminals on specific step-by-step connector banks. Substation 2983 must, therefore, have a connection to a step-by-step connector terminal which is on the eighth level of the connector at the third row of terminals.

Since it is desirable to include range extension only in those (special) connectors which serve long lines in view of the added cost of such facilities, it is obviously attractive to group all long lines at the special connector banks—in which event, such lines must be assigned appropriate numbering positions (in groups of one hundred) within the designated connector bank.

But the disadvantage of restricting the flexibility of number assignments to specified groups of 100 numbers is well known to telephone traffic personnel as well as others skilled in the art. Inefficiencies result from the necessity of reserving particular blocks of line numbers for long lines which may impair the flow of traffic and the loading of central office equipment. Apart from these considerations, customers although, in effect, connected to long lines, may have business or other reasons for requiring or preferring a directory number assignment which is not one of those included within the long line connector group.

The conflict is thus apparent. On the one hand, it is desirable to segregate long line customers for service by a specific long loop connector thereby decreasing the number of such connectors which must be provided; on the other hand, it is important to be able to assign the actual directory numbers of long line and non-long line customers on an unrestricted basis.

It is therefore an object of this invention to provide long line range extender facilities in step-by-step telephone switching systems wherein directory number assignments may be made to both long line customers and non-long line customers in a similar unrestricted manner.

These and other objects and features of the invention are realized in one specific illustrative embodiment in which translator facilities are provided for converting the directory number of long line customers to a distinct "transfer number" unique to a called long line customer. The transfer number is indicative of the physical location or equipment number on which the called long loop line is terminated in a special long loop connector having range extension facilities. As an illustration, directory number 2983 may be assigned a unique transfer number 9876 which is indicative of the termination of the substation loop having directory number 2983 on a special long loop connector at the sixth row of the seventh level. In this manner, it is possible to direct the connection of a called long line through a connector having range extension facilities although the directory number of the called line may arbitrarily be any number within the central office.

Another aspect of this invention relates to the efficient assignment of such long loop directory numbers in a manner which precludes use of two such numbers for each long line. Thus, in the illustration immediately preceding in which a long loop line having directory number 2983 was dialed, a call was extended through a translating mechanism to the line which was, in fact, terminated at equipment number 9876.

As is well known, directory numbers are, per se, a valuable commodity in telephone switching practice. It is, therefore, "expensive of" and, in part, a reduction in, overall office capacity to assign both numbers 2983 and 9876 to a single substation.

In consequence, as will be shown herein, the transfer number or physical equipment location number 9876 may, in fact, be used as a directory number of a non-long loop line in which event it is feasible to use the directory number 2983 in the hypothetical above, as the corresponding equipment location of directory number 9876. Thus, a call extended to a non-long line having directory number 9876 will, after translation, be directed instead to physical equipment location number 2983 representing the third row of the eighth level of a connector not equipped with range extension facilities.

These and other objects and features of the invention may be more readily comprehended from an examination of the following specification, appended claims and attached drawings, in which:

Figure 1:
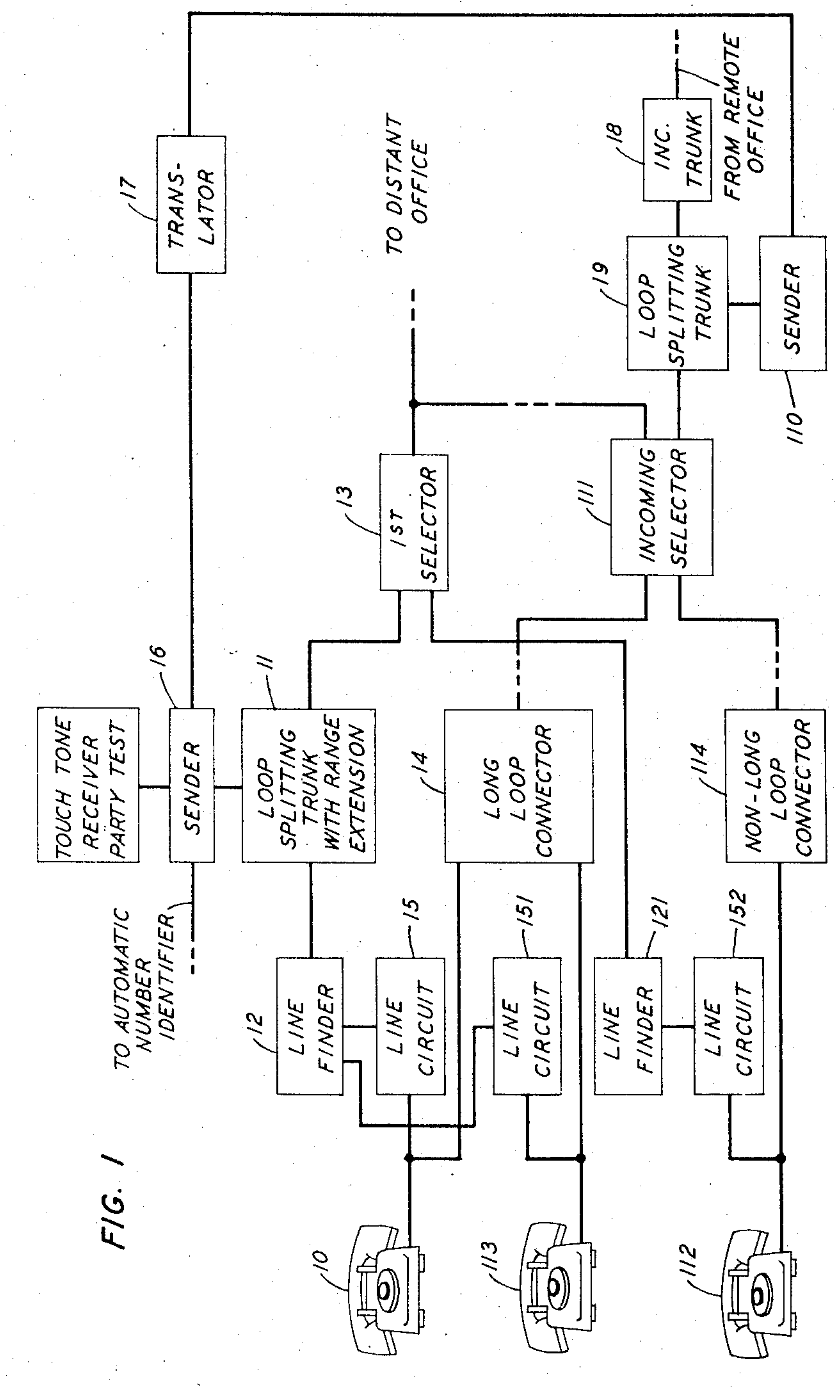
FIG. 1 shows in outline form one specific illustrative embodiment of my invention indicating the incorporation of the loop splitting trunk and a long loop connector both of which include range extension facilities in the originating and terminating switching trains of the substation.

Referring to FIG. 1, substation 10 which is illustratively a long loop line (for example, having a resistance between 1300–2500 ohms) is served by a loop splitting trunk 11 interposed between a line finder 12 and a first selector 13. The loop splitting trunk is equipped with range extension facilities as explained hereinafter in detail. It is understood that additional substations are, of course, served by the same line finder and that additional substations, e.g., 113, are terminated on long loop connector 14.

As is customary in step-by-step telephone practice, an off-hook condition at substation 10 initiates the operation of line finder 12 which hunts for and seizes the terminal of the calling line. Prior thereto, a line relay is operated in line circuit 15. It is understood that the line circuits utilized with long loop lines will be equipped with sensitive line relays which are operative over the high resistance loops.

The loop splitting trunk 11 hunts for and seizes the idle sender 16 which, on connection to the loop splitting trunk, receives a mark or long loop indication indicative of the initiation of a call by a long loop line. Thereupon, the sender transfers to a high voltage mode of operation to receive dial pulses and maintain supervision over the long loop. The utilization of a dial pulse register in a dual voltage mode of operation including higher voltage for long line calls is described in the above-referred-to application of A. Feiner, A. Zarouni, and C. W. Zebe. The sender 16 thereupon transmits a number identification signal over the sleeve of the calling line to obtain the identification of the line in a conventional manner, as described, for example, in Patent 3,243,514 of H. R. Moore et al. of Mar. 29, 1966. Subsequently, dial tone is returned to the calling substation.

The customer at substation 10 dials the directory number of the called substation (assumed to be outside the local office) and the digits are repeated to the first selector 13 and succeeding selectors (not shown) in the switch train. Moreover, the sender 16 transfers these called directory number digits to translator 17 for routing or other purposes. Thereupon, the sender will release and deliver a signal to the loop splitting trunk to couple in the amplifying facilities of the range extender circuit. Subsequently, the range extender provides both voice amplification and D-C supervision.

In the event of a terminating connection to the customer at long loop substation 113, a calling customer may dial, for example, the directory number 2983. When the incoming call is delivered through incoming trunk 18, it is extended to loop splitting trunk 19 which summons a sender 110. Thereupon, the called directory number 2983 is stored in the sender 110 and the translator 17 effects a translation to the actual or physical equipment number location of the called substation 113 which may, illustratively, be 9876. The sender 110, thereupon, releases the switching train priorly established to line 2983 (while the digits were being stored in sender 110) and, instead, commences the establishment of a connection to equipment number location 9876 on long loop connector 14.

Thereupon, the connection extends over incoming selector 111 as well as over selectors (not shown) in the terminating switching train and through long loop connector 14, which provides range extension facilities including A-C gain and D-C supervision in series with the connection, line circuit 151, to the called substation.

Calls to a non-long loop line are made through connector 114, for example, and line circuit 152 as shown for substation 112. Originating calls for non-long loop lines, such as line 112 are made through a separate line finder, for example finder 121.

If the calling party extending a connection to called substation 113 was within the same office, e.g., at substation 10, an intra-office call is effected between the first selector 13 and incoming selector 111 to extend the connection from the calling substation 10 to the called substation 113. Under these conditions, translator 17 and sender 16 function in the manner described above for an incoming call to extend the connection to the long loop connector 14.

Figure 2:
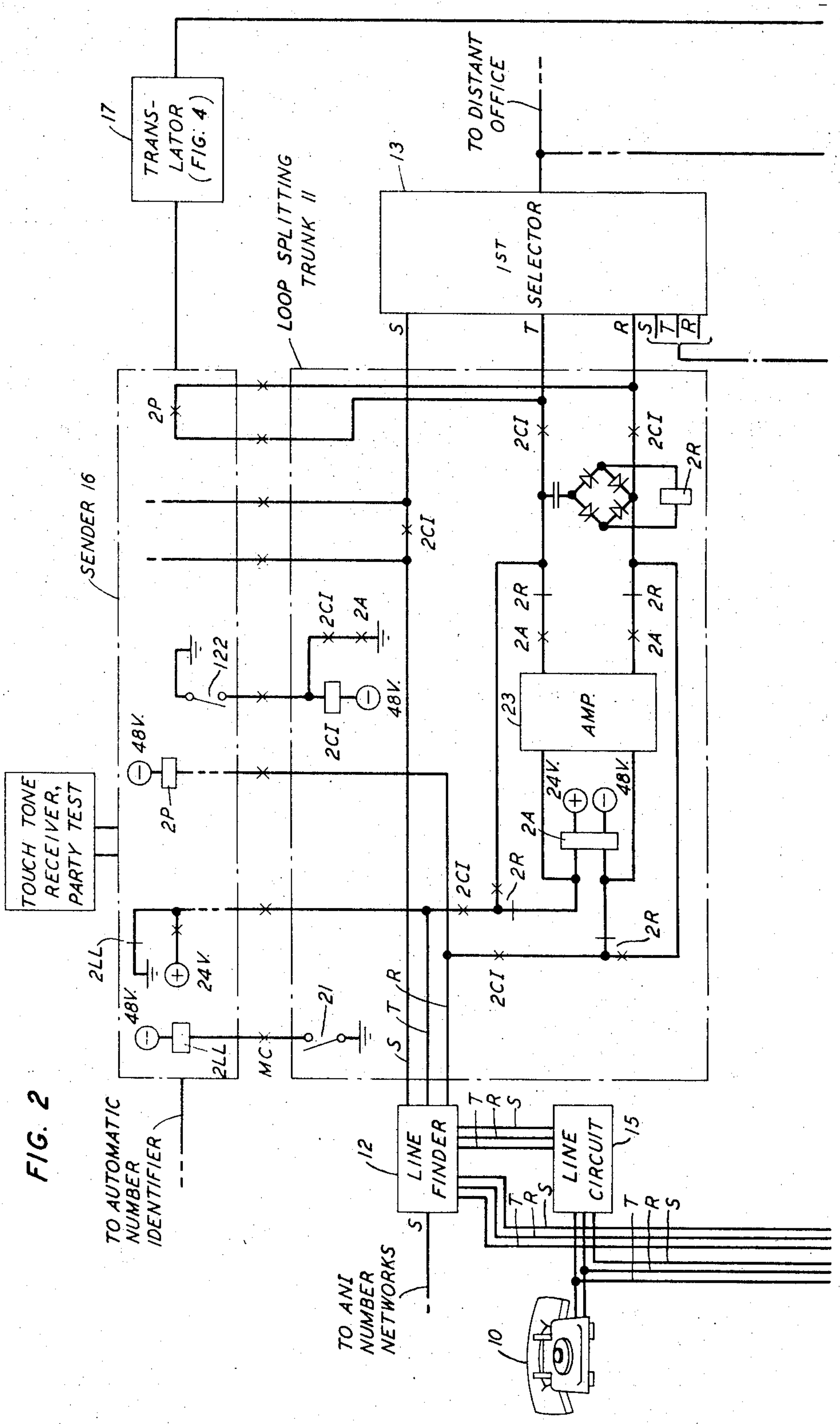
FIG. 2 shows portions of the loop splitting trunk and range extender circuit of FIG. 1 in detail.
Figure 3:
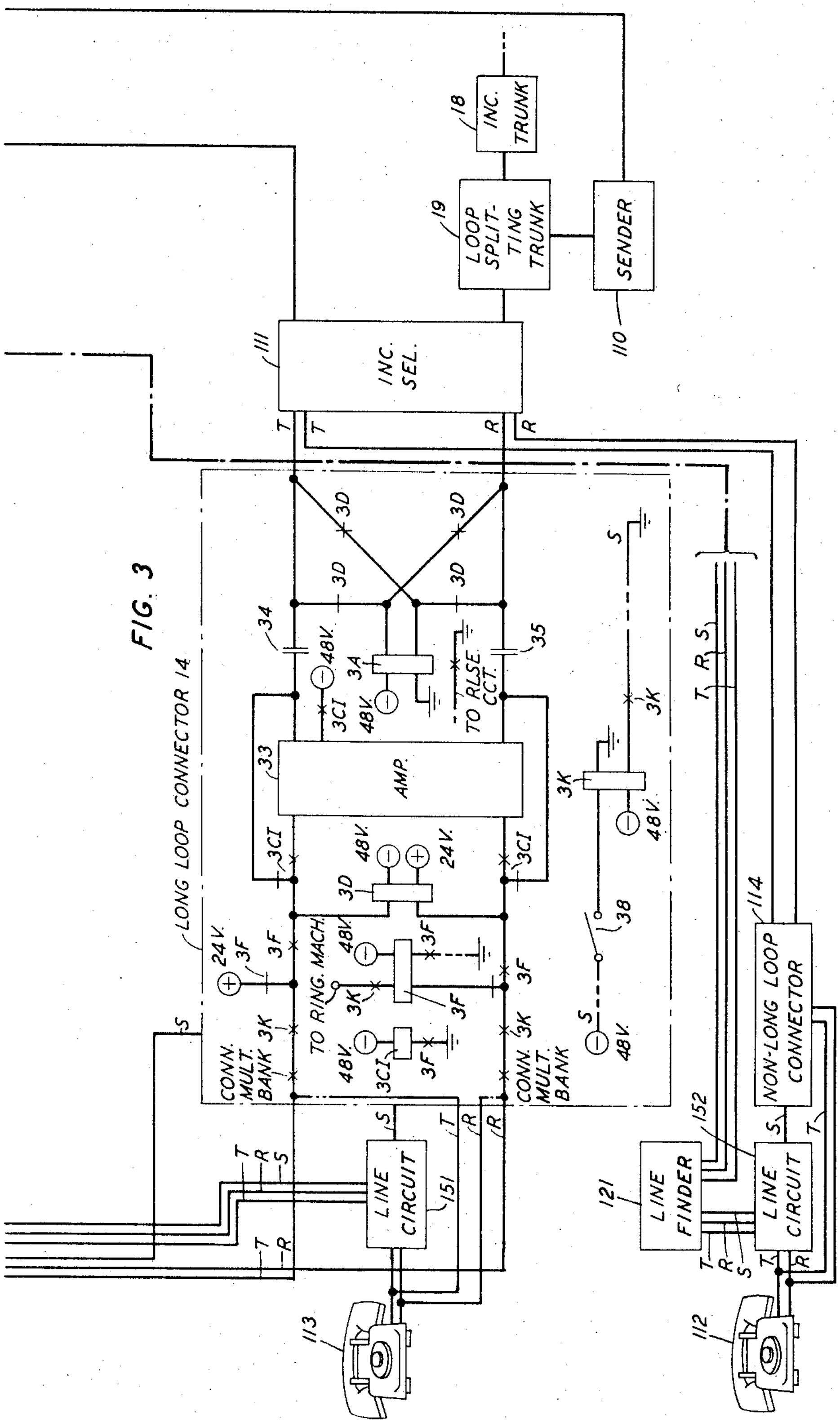
FIG. 3 shows portions of the long loop connector of FIG. 1 in detail.

Referring now to FIGS. 2 and 3, and placing FIG. 3 directly beneath FIG. 2, additional details of the circuitry shown in outline form in FIG. 1 are evident.

*Originating connection—Intra-office call*

Again, assuming that substation 10 is initiating a calling connection, line circuit 15 will be energized in the conventional manner and line finder 12 will hunt for and seize the terminals of calling substation 10. Since substation 10 is a long line circuit, the loop splitting trunk provides an indication to the sender 16 by operating relay 2LL over the contacts MC of a connector circuit which provides access between the loop splitting trunk and a plurality of senders in a conventional manner. This operation is shown symbolically herein by manual switch 21. Since it is feasible, without inconvenience, to group all of the long lines on the line finders in a segregated manner, the provisions of the long loop indication to the sender are straightforward. Reference may be made to Patent 3,133,155 of F. C. Kuchas of May 12, 1964 for an illustration of the use of a loop splitting trunk with a Touch-Tone receiver and party test equipment, shown only in outline form herein.

When relay 2LL is operated, a path is extended for the conversion of sender 16 to a higher voltage operating mode. Customarily, pulse relay 2P of the sender has negative 48 voltage battery applied at one side of the winding and ground at the contacts of relay 2LL on the other side whenever a dial pulse "make" (or loop closed) interval obtains. But, when the substation 10 receives dial tone and begins dialing a path is extended from substation 10, tip conductor T, line circuit 15, line finder 12, contacts MC of the connector (which provides access to plural senders), contacts of relay 2LL to positive 24 volt battery. Moreover, substation 10 extends over the ring conductor R of the loop through line circuit 15, line finder 12, contacts MC of the connector, winding of pulsing relay 2P to negative battery. In this manner, the relay 2P will respond to each dial pulse and the called directory number digits will be stored in the sender 16 in a conventional manner. Moreover, the sender repeats the received digits over the contacts of relay 2P to the first selector as well as to the translator 17. Since the translator includes a translation for the terminated called director number 2983, the translated number 9876 will be returned to the sender 16. A typical translator 17 is shown symbolically in FIG. 4. The relationship between a sender and translator may be examined in detail in an application of G. Riddell, filed Sept. 24, 1965, Ser. No. 489,807.

Figure 4:
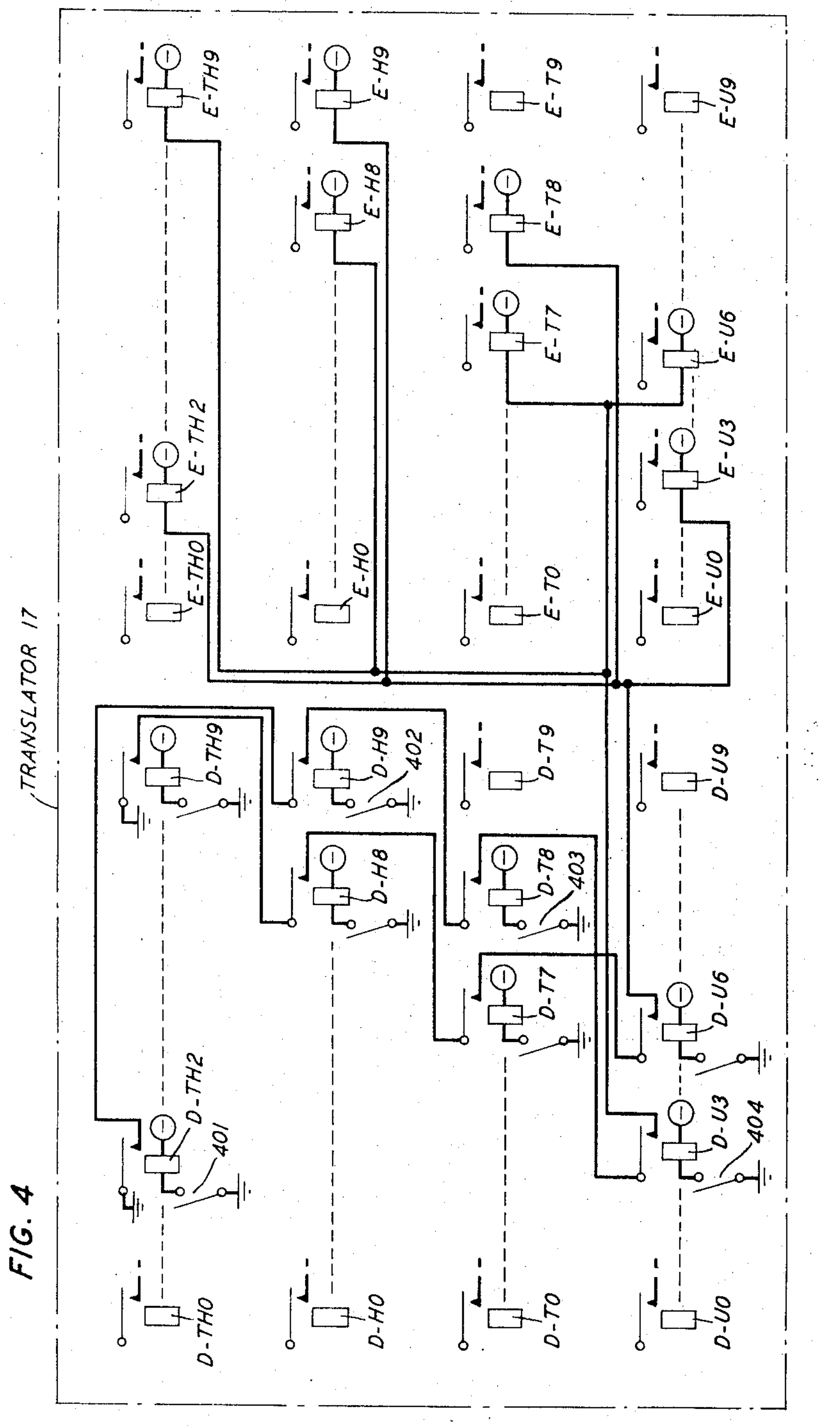
FIG. 4 shows a segment of the translator circuit of FIG. 1.

As shown in FIG. 4, however, two groups of relays are interconnected in a manner to provide directory number to equipment number translation. A group of 40 relays D–TH0 through D–TH9, D–H0 through D–H9, D–T0 through D–T9, and D–U0 through D–U9 are operated in accordance with the respective directory number to be translated. It is understood that a full complement of 40 relays will be utilized, although for clarity only 14 relays are shown for storing directory numbers.

The relays on the right-hand side of translator 17 are operated in accordance with the translated equipment number. These relays include 40 relays E–TH0 through E–TH9, E–H0 through E–H9, E–T0 through E–T9 and E–U0 through E–U9, although only 14 are shown.

In accordance with the assumed translation described above wherein the calling customer dials the called directory number 2983, the digits are transmitted from the sender 16 to the translator 17 in the manner described above. Thereupon, the translator 17 is operated in accordance with the stored directory number. Thus, relays D–TH2, D–H9, D–T8 and D–U3 are operated as shown symbolically by manual switches 401–404, respectively. A path may be traced from ground, contacts of relay D–TH2, D–H9, D–T8 and D–U3 to the windings of relays E–TH9, E–H8, E–T7 and E–U6 in parallel. When the latter relays are operated, corresponding information is returned to the sender representative of the translated equipment number 9876 corresponding to the called directory number 2983.

Thereupon, the switching train priorly established to the called directory number 2983 will be dismissed and, instead, the sender will outpulse the translated called directory number 9876 to extend a connection to the corresponding substation, for example substation 113, through long loop connector 14, described below.

Subsequently, the sender 16 initiates the operation of the range extender circuit as shown symbolically by manual switch 122 to operate relay 2CI. Cut-in relay 2CI locks operated over its own contacts and the contacts of relay 2A to complete the connection through the range extender to the first selector.

It will be noted that when relay 2CI is operated, the line finder 12 is connected to supervisory relay 2A which operates at a higher than normal potential and also to the amplifier circuit 23 which provides voice gain. Relay 2R is provided to bypass the range extender circuit when the operator rings back over the calling connection in emergency conditions or otherwise.

If the call had been directed to a non-long loop substation having directory number 9876, sender 16 would have delivered this number to the translator 17 which, in turn, would provide the corresponding transfer number 2983 on the non-long loop line to the sender.

Under these conditions, the translator 17 would have been operated in a manner to engage relays D–TH9, D–H,8 D–T7 and D–U6 to store the called directory number 9876. Thereupon, a path may be traced from ground, contacts of relays D–TH9, D–H8, D–T7, D–T6 to the windings of relays E–TH2, E–H9, E–T8 and E–U3 in parallel. The operation of the latter four relays is representative of the transfer number or translated equipment number 2983 corresponding to the called directory number 9876. The sender 16 thereupon pulses out the physical equipment location number 2983 of the non-long loop having directory number 9876 and establishes a conventional connection through line circuit 152 thereto, as shown for example at substation 112. In this manner, the transfer number 9876 of the long loop line having directory number 2983 may serve as the directory number 9876 of a non-long loop having transfer (equipment) number 2983. In consequence, it is unnecessary to utilize more than one directory number per line in the office even though transfers are provided on long loop calls.

On outgoing originating calls to other offices, the operation is similar to that described above with the translator function with respect to obtaining transfer numbers being omitted, although routing and related information may be returned by the translator to the sender. The range extension circuit is interposed by relay 2CI when the sender releases, as described above.

*Terminating connection*

As shown in FIG. 3, an incoming call to long loop substation 113 is provided through a special long loop connector which includes range extension facilities. Illustratively, a connector group may be provided for each 100 long loop numbers.

If it is assumed that a call from a distant office has been directed by a substation, not shown, to called substation 113, a switch train will be extended in a conventional manner, to incoming trunk 18 on FIG. 3 and will be further extended by the loop splitting trunk 19 to a sender 110. This sender will operate in a manner similar to that described above for sender 16 by registering the called directory number and transmitting information respecting the called digits to translator 17 as well as repeating the called directory number digits through the incoming selector 111 and other selectors in the switching train (not shown) and to the connector on which the called directory number 2983 appears. In fact, as was explained above, substation 113, although having directory number 2983, is terminated at the connector including physical equipment number 9876. The latter number is obtained by the sender 110 from the translator 17 in a manner similar to that described above. Thereupon, the sender having stored the transfer number 9876 corresponding to substation 113 will release the priorly established switching train extending to the physical equipment location number 2983 and will, instead, pulse out the digits 9876 to establish a connection to the long loop connector 14 and ultimately to substation 113.

When the long loop connector is seized, relay 3K is operated, as shown symbolically by manual switch 38. Operation of relay 3K extends a path from ground (not shown) in the ringing machine, contacts of relay 3K, winding of relay 3F, contacts of relay 3F, additional contacts of relay 3K, connector multiple, ring conductor R, substation loop, tip conductor T, connector multiple contacts, additional contacts of relay 3K, additional contacts of relay 3F to positive battery. Operation of relay 3F, when the called customer answers, trips ringing and results in the operation of cut-in relay 3CI which, thereupon, extends a path from the incoming selector, condensers 34 and 35, in parallel, amplifier 33, contacts of relay 3CI, contacts of relay 3F, contacts of relay 3K through the connector multiple bank (shown symbolically) and line circuit 151 to the tip and ring leads extending to the called substation. Relay 3A is arranged to provide supervision to the calling connection and relay 3A provides the conventional reverse battery supervision to the switch train in response to the operation of relay 3D, which latter provides high level voltage supervision of the called customer.

It is to be understood that the above-identified arrangements are illustrative of the application of the principles of the invention. Numerous other arrangements may be devised by those skilled in the art without departing from the spirit and scope of the invention.

What is claimed is:

1. A step-by-step switching system including a plurality of long loop customer lines having higher than a predetermined resistance, a connector circuit having terminations for terminating said lines, a terminating switching train of selector circuits coupled to said connector circuit, a loop splitting trunk interposed in said switching train, a sender circuit connectable to said switching train through said loop splitting trunk, and a translator circuit connectable to said sender circuit and responsive to the initiation of a terminating connection to one of said long loop lines for receiving the digits corresponding to the called directory number of said long loop line and for translating said directory number to a corresponding transfer number and equipment termination on said connector circuit.

2. A step-by-step telephone switching system in accordance with claim 1 wherein said connector circuit includes range extension means for repeating supervisory signals and for amplifying A–C signals.

3. A step-by-step telephone switching system including a plurality of long lines having higher than a predetermined resistance and requiring range extension, a line finder circuit for hunting calling ones of said lines, a first selector circuit for extending connections to an originating switching train, a loop splitting trunk circuit interposed between said line finder circuit and first selector circuit, and a sender circuit connectable to said line finder circuit and first selector circuit through said loop splitting trunk circuit for receiving called directory number digits, said loop splitting trunk including range extender means for repeating supervisory signals and for amplifying voice signals.

4. A step-by-step telephone switching system in accordance with claim 3 wherein said sender means is operative in response to a calling condition from one of said long lines for transferring to a high voltage operating mode preparatory to dial pulse reception.

5. A step-by-step telephone switching system in accordance with claim 3 including in addition terminating sender means, a terminating loop splitting trunk, long loop connector means, translator means connectable to said terminating sender means, and means including said translator means effective on a terminating call to a called long line for translating the directory number of said called long line to a corresponding equipment number termination on said long loop connector means.

6. A step-by-step telephone switching system including a plurality of long lines having a sufficient resistance to require range extension, a terminating switching train including a sender, an incoming trunk, an incoming selector, a loop splitting trunk interposed between said incoming trunk and selector, a long loop connector, translator means connectable to said sender through said loop splitting trunk for accepting the directory number of a called long loop substation from said sender and for returning to said sender a corresponding transfer number termination on said long loop connector, said sender including voltage mode transfer means for converting from a relatively lower to a higher voltage mode of operation in extending connections to said long loop substation, and range extender means in said loop splitting trunk including supervisory relay means for D–C repetition and A–C amplifier means for voice amplification.

7. A step-by-step telephone switching system including a plurality of long loop stations having a sufficient loop resistance to require range extension, a switching train including a line finder circuit on which said long lines are grouped, a first selector circuit, a loop splitting trunk interposed between said line finder and first selector circuit, a sender circuit connectable to said line finder and first selector through said loop splitting trunk, a connector individual to said long loop stations, and translator means connectable to said sender and effective on intra-office calls between long loop stations for converting a called directory number corresponding to a called long loop station to a respective equipment number indicative of a termination on said connector individual to said long loop stations, said sender including mode transfer means for operating in a higher voltage mode on long loop calls than on non-long loop calls, said loop splitting trunk including range extender means effective for repeating direct current signals and for amplifying alternating current signals.

8. A step-by-step telephone switching system including a first group of long loop lines having higher than a predetermined resistance, a second group of non-long loop lines having less than a predetermined resistance, a terminating switching train in said system including a long loop connector including equipment number terminations on which said long loop lines are terminated, a non-long loop connector including equipment number terminations on which said non-long loop lines are terminated, an incoming selector and an incoming trunk in said train with said long loop connector, a loop splitting trunk interposed between said incoming trunk and said incoming selector, a sender for receiving pulsed digits through said loop splitting trunk, and translator means responsive to the digits received by said sender for translating the directory number of a called long loop line to a corresponding equipment number termination on said long loop connector and in addition for translating directory numbers received by said sender indicative of called non-long loop lines to equipment number terminations on said non-long loop connectors.

9. A step-by-step switching system including a plurality of long loop customer lines having higher than a predetermined resistance and requiring range extension, a line finder circuit for hunting calling ones of said lines, a first selector circuit for extending connections to an originating switching train, a first loop splitting trunk circuit interposed between said line finder circuit and said first selector circuit, a first sender circuit connectable to said line finder circuit and said first selector circuit through said first loop splitting trunk circuit for receiving called directory number digits, said first loop splitting trunk circuit including range extension means for repeating supervisory signals and for amplifying voice signals, a connector circuit having terminations for terminating said lines and including range extension means for repeating supervisory signals and for amplifying voice signals, a terminating switching train of selector circuits coupled to said connector circuit, a second loop splitting trunk circuit interposed in said terminating switching train, a second sender circuit connectable to said terminating switching train through said second loop switching trunk circuit, and a translator circuit connected to said first and second sender circuits for translating directory numbers of long loop lines to corresponding equipment locations on said line finder circuit and said connector circuit.

References Cited

UNITED STATES PATENTS

| | | | |
|---|---|---|---|
| 1,647,796 | 11/1927 | Glezen et al. | 179—16 |
| 1,763,893 | 6/1930 | Krecek | 179—16 |

KATHLEEN H. CLAFFY, *Primary Examiner.*

J. S. BLACK, *Assistant Examiner.*